United States Patent [19]

Oughton

[11] 4,154,728

[45] May 15, 1979

[54] PROCESS FOR THE TREATMENT OF COMMINUTED PROTEINACEOUS MATERIAL

[75] Inventor: Richard W. Oughton, Odessa, Canada

[73] Assignee: Du Pont of Canada, Ltd., Montreal, Canada

[21] Appl. No.: 747,733

[22] Filed: Dec. 6, 1976

[30] Foreign Application Priority Data

Dec. 16, 1975 [GB] United Kingdom ............... 51498/75

[51] Int. Cl.$^2$ ................................................ A23J 1/12
[52] U.S. Cl. ............................. 260/123.5; 260/112 R; 426/656
[58] Field of Search ........................ 260/112 R, 123.5

[56] References Cited

U.S. PATENT DOCUMENTS

| | | | |
|---|---|---|---|
| 3,520,868 | 7/1970 | Henderson et al. | 160/112 R |
| 3,615,655 | 10/1971 | Freeman et al. | 99/17 |
| 3,615,657 | 10/1971 | Gastrock et al. | 426/430 X |
| 3,869,438 | 3/1975 | Finley et al. | 260/123.5 |
| 3,972,861 | 8/1976 | Gardner et al. | 260/123.5 |

FOREIGN PATENT DOCUMENTS 864538  2/1971  Canada.
905909  7/1972  Canada.

OTHER PUBLICATIONS

Finley, *J. Food Sci.*, vol. 41, No. 4 (1976) pp. 882–885.

*Primary Examiner*—Walter C. Danison

[57] ABSTRACT

A process for the treatment of comminuted proteinaceous materials so as to effect separation of the comminuted proteinaceous materials into fractions differing in composition is disclosed. The process comprises admixing comminuted proteinaceous materials, or fractions derived therefrom, with an organic solvent for any oil in the proteinaceous material and separating the proteinaceous material in the admixture into fractions differing in, in particular, protein content. The separation may be effected by for example subjecting the admixture, in the form of a slurry, to the influence of centrifugal force. In embodiments, a centrifuge and/or a hydrocyclone may be used. The proteinaceous materials are selected from wheat, rye, barley, triticale, peas, beans and buckwheat. Examples of suitable solvents are pentane, hexane, heptane, cyclohexane and alcohols of 1–4 carbon atoms. A variety of products are obtainable, including protein-enriched and protein-deficient endosperm fractions. The products have a variety of uses in the food industry.

44 Claims, No Drawings

PROCESS FOR THE TREATMENT OF COMMINUTED PROTEINACEOUS MATERIAL

The present invention relates to a process for the treatment of proteinaceous material so as to effect separation of the comminuted proteinaceous material into fractions differing in composition. In particular, the present invention relates to the treatment of comminuted proteinaceous material so as to separate fractions differing in protein content and/or to separate the comminuted proteinaceous material into an endosperm fraction, and "outer coat" fraction and an oil.

As used herein proteinaceous material is defined as wheat, rye, barley, triticale, peas, beans and buckwheat. The outer coat of the cereal grains viz. wheat, rye, barley and triticale is also known as bran, such bran may have endosperm attached thereto, whereas the outer coat of peas, beans and buckwheat is also known as the seed coat. The endosperm of peas and beans is also known as the cotyledon. For the cereal grains and buckwheat the endosperm may include the germ. The expression "gum" used herein refers in particular to water-soluble gums, if present in the particular proteinaceous material.

The proteinaceous materials are a potential source of a wide variety of useful products. Examples of such products are flour, starch, protein-enriched and protein-depleted products, bran, gum and oil, depending on the particular proteinaceous material. Traditional techniques used in the food processing industry if available, for the treatment of proteinaceous material so as to effect the separation of the proteinaceous material into fractions of differing composition are capable of improvement, for example with respect to energy requirements, potential pollution problems and the taste and/or colour of products. In other instances techniques may not be available for the conversion of the proteinaceous material into commercially viable products for example products of increased protein content.

Processes for the separation of a variety of products from comminuted oats are disclosed in Canadian Application No. 245,163 of A. Bell, J. R. B. Boocock and R. W. Oughton, filed Feb. 4, 1976 and in Canadian Application No. 254,864 of R. W. Oughton, filed June 15, 1976. A process for isolating protein from a pulverized oil seed using liquid fluorocarbons is disclosed in U.S. Pat. No. 3,869,438 of J. W. Finley et al, which issued Mar. 4, 1975. The density separation of protein and carbohydrates from wheat flour, soybeans, green peas and dried acid whey using a non-aqueous solvent system is described by J. W. Finley in Journal of Food Science, 41, 882–885 (1976). Processes for the solvent-extractive milling of maize or corn, wheat, rye and the sorghum grains to remove the bran coat from whole kernels of such grains followed by comminution of the whole milled kernels and for the separation of so-called fibrous, proteinaceous, endosperm and/or starch fractions derived from such grains are disclosed by T. B. Wayne in Canadian Pat. No. 864,538, which issued Feb. 23, 1971, and Canadian Pat. Nos. 905,909 and 905,910, both of which issued July 25, 1972.

A need exists for a process for the treatment of comminuted proteinaceous materials, so as to effect the separation of fractions of differing composition.

A process for the separation of fractions differing in composition from proteinaceous materials has now been found.

Accordingly the present invention provides a process for the separation of proteinaceous material into at least two fractions, the proteinaceous material being selected from the group consisting of wheat, rye, barley, triticale, peas, beans and buckwheat, said process comprising:

(a) admixing comminuted proteinaceous material with an organic solvent, said solvent being selected from the group consisting of pentane, hexane, heptane, cyclohexane and alcohols of 1–4 carbon atoms, and mixtures thereof; and (b) separating the admixture of comminuted proteinaceous material and solvent into at least two fractions, one fraction having an outer coat of the proteinaceous material as a substantial part of the solid component and a second fraction having endosperm as the major solid component, the amount of endosperm separated being at least 5% of the comminuted proteinaceous material.

The present invention also provides a process for the separation of comminuted proteinaceous material into fractions differing in composition, the proteinaceous material being selected from the group consisting of wheat, rye, barley, triticale, peas, beans and buckwheat, said process comprising:

(a) admixing comminuted proteinaceous material with an organic solvent, said solvent being selected from the group consisting of pentane, hexane, heptane, cyclohexane and alcohols of 1–4 carbon atoms, and mixtures thereof;

(b) forming a slurry of said admixture of comminuted proteinaceous material and solvent; and (c) subjecting the slurry to the influence of centrifugal force and thereby separating the comminuted proteinaceous material in said slurry into at least two fractions, said fractions differing in composition.

In addition the present invention provides a process for the separation of comminuted proteinaceous material into fractions differing in composition, the proteinaceous material being selected from the group consisting of wheat, rye, barley, triticale, peas, beans and buckwheat, said process comprising:

(a) admixing a proteinaceous fraction, derived from said comminuted proteinaceous material, with an organic solvent, said solvent being selected from the group consisting of pentane, hexane, heptane, cyclohexane and alcohols of 1–4 carbon atoms, and mixtures thereof;

(b) forming a slurry of said admixture of proteinaceous fraction and organic solvent; and (c) subjecting the slurry to the influence of centrifugal force and thereby separating said proteinaceous fraction into at least two fractions, said fractions differing in protein content.

Furthermore the present invention provides a process for the separation of comminuted proteinaceous material into fractions differing in composition, the proteinaceous material being selected from the group consisting of wheat, rye, barley, triticale, peas, beans and buckwheat, said process comprising:

(a) admixing a proteinaceous fraction, derived from said comminuted proteinaceous material, with an organic solvent, said solvent being selected from the group consisting of pentane, hexane, heptane, cyclohexane and alcohols of 1–4 carbon atoms, and mixtures thereof;

(b) subjecting said admixture to the influence of centrifugal force in a centrifuge and thereby forming a centrifuge cake of said proteinaceous fraction, and (c) separating said cake in the substantial absence of said solvent into at least two layers, the protein content of at least one of said layers being different from the protein content of at least one of said other layers.

In the process of the present invention the proteinaceous materials that are cereal grains or buckwheat are preferably dehulled, if necessary, prior to comminution. Techniques for dehulling cereal grains and buckwheat are known. In addition peas and beans should be separated from their pods. The proteinaceous materials are comminuted in order to facilitate extraction of any oil and to facilitate separation of a subsequently formed admixture of comminuted proteinaceous material and solvent into fractions differing in composition. The particle size of the comminuted proteinaceous material will depend in particular on the technique to be used to separate the comminuted proteinaceous material in the admixture into fractions and may affect the segregation of protein in the material. For example, if a hydrocyclone is used to separate the proteinaceous material into fractions, the particle size of the comminuted proteinaceous material must be sufficiently small to allow the hydrocyclone to operate smoothly and efficiently and without plugging of the hydrocyclone. Conventional techniques, for example, pinmilling, hammer milling and other shearing techniques would appear to produce an acceptable comminuted proteinaceous material, the preferred techniques depending in particular on the actual separation techniques to be used.

In the process of the present invention the comminuted proteinaceous material is admixed with an organic solvent, especially an organic solvent for any oil that may be in the proteinaceous material. Such admixing facilitates extraction of oil, if present, in the proteinaceous material. The solvents used must be acceptable for use with foodstuffs, e.g. be nontoxic at the levels remaining in the products subsequently produced, not cause the formation of toxic materials in the product and not have a significant deleterious effect on the nutritional value of the product, and must be capable of permitting separation of the fractions. The amount and type of solvent remaining in products offered for sale must be acceptable to the appropriate health authorities, as will be understood by those skilled in the art. Examples of solvents are pentane, hexane, heptane, cyclohexane and alcohols of 1-4 carbon atoms, and mixtures thereof; as used herein the solvents hexane and heptane include those solvents referred to in the food industry as hexane and heptane. The preferred solvent is hexane. The present invention will generally be described hereinafter with reference to hexane as the solvent.

In the process of the present invention the comminuted proteinaceous material is admixed with the organic solvent e.g. hexane. Such admixing is preferably carried out with agitation e.g. stirring and may be so as to form a slurry. If oil is present in the proteinaceous material the total period of time during which the comminuted proteinaceous material and hexane are admixed should be such that the desired degree of extraction of any oil from the comminuted proteinaceous material is achieved, the period of time being dependent in part on the actual technique of extraction. Generally a slurry of comminuted proteinaceous material and hexane will be used.

The separation of the fractions of proteinaceous material may be carried out by one or more embodiments of the process of the present invention. The preferred embodiment will depend in particular on the particular proteinaceous material and on the desired products.

In one embodiment the admixture of comminuted proteinaceous material and hexane is thoroughly mixed using for example a stirrer. The admixing may then be adjusted to effect separation of fractions of the proteinaceous material. For example if mixing is discontinued one fraction, which contains the outer coat i.e. bran if the proteinaceous material is a cereal grain or buckwheat, tends to settle significantly faster than a second fraction comprised of endosperm. Separation may be effected by for example decantation. When such a separation is used it is preferable to repeat the separation one or more times, optionally subjecting the outer coat fraction to further comminution to aid in the separation of any endosperm adhered to the outer coat. Alternatively a separation may be effected by sieving the admixture. The mesh size of the sieve will depend primarily on the degree of separation desired. Preferably a sieve having a fine mesh e.g. 200 or finer, is used. The outer coat fraction will tend to be retained on the sieve and may be used as such or, especially if the outer coat is bran, subjected to further comminution and subsequent further separation into fractions. The endosperm fraction tends to pass through the sieve.

In another embodiment the stirring of the admixture of comminuted proteinaceous material and hexane is controlled so that the separation of the comminuted proteinaceous material into fractions occurs in situ i.e., a non-uniform distribution of the proteinaceous material occurs in the admixture. Separation of one fraction from the admixture may be effected by adding additional solvent, preferably in a continuous manner, and removing, preferably simultaneously removing, a fraction of the comminution proteinaceous material in hexane. The fraction separated is preferably a fraction comprised of endosperm. It may be desirable to sieve the fraction being separated so as to remove any oversize particles therefrom. The fraction not separated from the admixture and/or any oversize particles removed from the fractions being separated may be subjected to further comminution and subsequently further separation.

In a further embodiment the admixture of comminuted proteinaceous material and hexane is admixed in the form of a slurry and then subjected to the influence of centrifugal force. The means used to subject the slurry to centrifugal force is a centrifugal separator, preferably a centrifugal separator capable of being operated on a continuous or semi-continuous basis. Examples of centrifugal separators are continuous centrifuges, including semi-continuous centrifuges, and hydrocyclones.

In order to effect separation of a slurry of comminuted proteinaceous material and hexane into fractions in a hydrocyclone, the slurry is fed to the hydrocyclone whereupon the slurry is subjected to centrifugal force and fractionation of the comminuted proteinaceous material in the slurry tends to occur. The operation of a hydrocyclone so as to obtain a desired fractionation of the comminuted proteinaceous material in the slurry will depend on a number of process variables, as will be understood by those skilled in the art. Examples of such variables are degree of comminution of the proteinaceous material, the amount of solid material in the slurry, the pressure drop across the hydrocyclone, the ratio of the flows through the so-called "underflow" and "overflow" outlets, the solvent and the like. The operation of the hydrocyclone is adjusted so that a desired fractionation is obtained.

While the present invention has been described hereinbefore with particular reference to the separation of comminuted proteinaceous material into fractions thereof, the present invention is not limited thereto. In a preferred embodiment, particularly with respect to the use of centrifugal force, the material which is subjected to separation is a proteinaceous fraction derived from proteinaceous material by means described herein or by other means known in the art. In particular the material subjected to the influence of centrifugal force is a proteinaceous fraction that has been obtained by classifying an admixture of comminuted proteinaceous material and hexane e.g. by sieving, decanting and the like as described hereinabove.

In general in the embodiments of the present invention, the fractions obtained will comprise at least 5%, and preferably at least 20%, of the comminuted proteinaceous material or of the proteinaceous fraction derived therefrom.

The use of the influence of centrifugal force on proteinaceous fractions derived from comminuted proteinaceous material, rather than on the comminuted material per se, may be advantageous in that process problems associated with large particles e.g. the clogging of hydrocyclones, may be reduced or avoided. In particular endosperm fractions may be subjected to the influence of centrifugal force in a continuous centrifuge or hydrocyclone. Proteinaceous fractions, especially endosperm fractions, may be subjected to single or multiple treatments under the influence of centrifugal forces to produce a variety of products, especially products of varying protein content.

In a particular embodiment of the process of the present invention, an endosperm fraction is subjected to the influence of centrifugal force in a centrifuge. After separation of the solvent, e.g. hexane, the cake of solid material obtained may be selectively split into fractions of differing protein content. Techniques for the selective splitting of a centrifuge cake into fractions are known. For example a basket centrifuge may be used as the centrifuge and the fractions may be split out of the basket using a knife blade, as is known for basket centrifuges.

In the process of the present invention it is preferred that water not be added to the admixtures of comminuted proteinaceous material, or fractions derived therefrom, and solvent. As exemplified hereinafter, the addition of water may actually adversely affect the separation of the fractions. Although water is preferably not added to the admixtures, it is not necessary to remove water naturally present in the proteinaceous material.

The proteinaceous material in the fractions separated according to the present invention may be separated from the solvent miscella by known techniques e.g. by the use of a centrifuge. Any oil in the solvent may also be recovered.

In a preferred embodiment of the process of the present invention the cereal grains, especially wheat, rye and triticale, have a hardness of less than 50. Hardness is defined as the time in seconds to pass 20 g of material through a 28 mesh TYLER ® screen in a WILEY ® mill. The measurement of hardness is discussed in greater detail in "Wheat Quality Evaluation Part I Accuracy and Precision of Prediction Tests", I. A. de la Roche and D. B. Fowler, Can. J. Plant Sci. 55 241-240, January 1975. The hardness numbers obtained for some cereal grains are given in Table I hereinafter.

The endosperm fraction, which may be referred to as flour, that is separated according to the process of the present invention is essentially free of any oil in the proteinaceous material. The products of the process of the present invention are believed to be useful in the food industry either as such or as a source of other products. For example flour or endosperm fractions are capable of being used as such or when enriched with protein as nutritional fortifiers in foods, in cereals, baby foods, cakes and the like; the particular end-use will depend to a significant extent on the particular proteinaceous material from which the fraction is derived. For example fractions derived from barley may be particularly useful in baby foods and those from buckwheat in oriental foods. Fractions derived from peas and beans are significantly de-coloured in the process of the present invention and may be particularly useful as nutritional fortifiers. Fractions derived from rye are characterized by the substantial absence of the taste associated with that cereal grain. The process of the present invention is capable of increasing the protein content of in particular low protein wheat thereby rendering such wheat useful in end-uses otherwise requiring a wheat of higher natural protein content. Starchy materials i.e. endosperm fractions of low protein content, especially from wheat, may be useful in pastries and in known uses for starches. The oils obtained are useful in a variety of end uses for example as vegetable oils.

The present invention is illustrated by the following examples. In the examples the protein content is Kjeldahl nitrogen content times 6.25.

EXAMPLE I

A proteinaceous material was comminuted, in sequence, on a knife mill and a pin mill to produce a finely ground material. 150 g of the finely ground material was admixed in the form of a slurry with 300 g of hexane for 5 minutes. The slurry was then sieved with a 200 mesh TYLER screen. The material retained on the screen was re-admixed with 150 g of hexane for 5 minutes and re-sieved through the 200 mesh screen. The oversized material thus obtained, i.e. that retained in the screen, was dried in a vacuum oven and analyzed for protein.

The undersized material i.e. that passing through the screen in each instance, was combined and centrifuged for 10 minutes at 1000 G. The hexane miscella was decanted off and a composite sample of the solid material was analyzed for protein. The remaining solid material was re-admixed, as a slurry, with 75 g of hexane, poured into a 43×123 mm extraction thimble supported in a 250 ml centrifuge cup and centrifuged at 1000 G for 10 minutes. The hexane was decanted off. The thimble was cut open, the depth of the centrifuge cake obtained was measured and a thin layer was taken from the top, middle and bottom sections of the cake for protein analysis. All protein analysis were carried out on dried samples using a Kjel-Foss Automatic 16210 protein analyzer.

The oil from the hexane miscella was recovered using a rotary evaporator.

Details of the proteinaceous materials used and the results obtained are given in Table I. In each case the colour of the centrifuge cake of undersized material was white.

TABLE I

| Run No. | Proteinaceous Material Type* | Protein (%) | Oil Wt. (g) | Oversized Sample Wt. (g) | Oversized Sample Protein (%) | Composite Sample Protein (%) | Cake Depth (mm) | Undersized Sample Protein(%) Top | Middle | Bottom |
|---|---|---|---|---|---|---|---|---|---|---|
| 1 | A | 25.4 | 1.3 | 83 | 28.3 | 26.9 | 51 | 52.5 | 17.5 | 21.1 |
| 2 | B | 30.4 | 1.9 | 91 | 32.1 | 34.1 | 41 | 64.7 | 21.9 | 27.9 |
| 3 | C | 22.8 | 1.8 | 79 | 26.6 | 23.7 | 50 | 52.4 | 13.8 | 15.5 |
| 4 | D | 11.4 | 2.3 | 102 | 14.0 | 10.3 | 33 | 17.3 | 9.0 | 5.7 |
| 5 | E | 13.5 | 2.6 | 108 | 15.3 | 10.6 | 34 | 19.4 | 8.6 | 6.7 |
| 6 | F | 10.9 | 2.2 | 92 | 12.7 | 10.9 | 43 | 25.6 | 7.1 | 10.3 |
| 7 | G | 12.6 | 2.0 | 99 | 14.0 | 11.3 | 43 | 26.3 | 5.6 | 8.1 |
| 8 | H | 12.4 | 1.6 | 98 | 14.1 | 9.3 | 44 | 25.7 | 4.3 | 5.8 |
| 9 | I | 14.9 | 1.3 | 94 | 16.7 | 12.9 | 50 | 36.2 | 6.6 | 10.7 |
| 10 | J | 9.0 | 1.8 | 72 | 11.6 | 7.9 | 60 | 27.1 | 5.2 | 7.1 |
| 11 | K | 12.9 | 2.1 | 118 | 13.4 | 13.0 | 30 | 20.5 | 11.6 | 12.4 |
| 12 | L | 18.8 | 2.1 | 118 | 18.6 | 22.6 | 27 | 28.5 | 23.3 | 23.4 |
| 13 | M | 16.8 | 2.0 | 125 | 16.6 | 20.8 | 25 | 31.6 | 19.1 | 19.3 |
| 14 | N | 16.1 | 2.0 | 87 | 16.5 | 14.5 | 50 | 38.9 | 8.2 | 12.1 |

*A ..... field peas (pisum sativum)
B ..... horse beans (vicia faba)
C ..... navy beans (phaseoulus vulgaris)
D ..... buckwheat (not dehulled)
E ..... buckwheat (dehulled)
F ..... barley (not dehulled)
G ..... barley (dehulled)
H ..... rye (puma), hardness = 44.1
I ..... triticale (rosner), hardness = 47.8
J .....Fredrick soft white winter wheat, hardness = 37.0
K ..... Opal utility spring wheat, hardness = 61.5
L ..... Neepawa hard red spring wheat, hardness = 56.0
M ..... Glenlea spring utility wheat, hardness = 66.1
N ..... Cal-15 spring utility wheat, hardness = 44.8

EXAMPLE II 25 g of a comminuted proteinaceous material were admixed with 75 g of hexane in a WARING* blender for 10 minutes. The admixture thus obtained was poured into a beaker, stirred thoroughly and the liquid fraction, containing suspended solids, was decanted off, the heavy non-suspended solids (residue) being retained in the beaker. The liquid fraction was centrifuged at 1000 G for 5 minutes using an extraction thimble in the centrifuge cup. The thimble was then cut open and composite analytical-size samples were taken from the top and bottom of the centrifuge cake obtained. After drying protein analyses were carried out on the top and bottom samples and on the residue.

Details of the proteinaceous materials and the results obtained are given in Table II.

In all cases the hexane miscella obtained was yellow in colour and the solid samples were off-white.

TABLE II

| Proteinaceous Material Type | Protein Content(%) | Protein Content of Centrifuged Samples (%) Top | Bottom | Protein Content of Residue (%) |
|---|---|---|---|---|
| Horse Beans | 26.3 | 47.6 | 21.7 | 24,6 |
| Field Peas (whole) | 27.1 | 42.0 | 26.7 | 26.3 |
| Field Peas (split) | 21.7 | 48.5 | 14.7 | 21.7 |

EXAMPLE II

A proteinaceous material was coarsely ground and then finely ground using a pinmill. A 15 g sample of the comminuted proteinaceous material thus obtained was de-oiled with hexane in a Soxhlet extraction apparatus for one hour. The de-oiled material was admixed with 15 g of hexane in a WARING blender for 15 minutes, poured into a beaker and thoroughly stirred. The liquid fraction, containing suspended solids, was decanted off, the heavy non-suspended solids (residue) being retained in the beaker. The liquid fraction was centrifuged at 1000 G for approximately five minutes using an extraction thimble in the centrifuge cup. The thimble was then cut open and composite analytical-size samples were taken from the top, middle and bottom sections of the centrifuge cake obtained. After drying protein analyses were carried out on the top, middle and bottom samples and on the residue.

The above procedure was repeated except that in separate experiments water in an amount equal to approximately 30% or 100% of the weight of protein and fibre in the comminuted proteinaceous material was added to the hexane in the WARING blender.

Details of the proteinaceous materials and the results obtained are given in Table III.

TABLE III

| Proteinaceous Material Type | Protein Content(%) | Amount of Water Added(5) | Protein Content of Centrifuged Samples (%) Top | Middle | Bottom | Protein Content of Residue (%) |
|---|---|---|---|---|---|---|
| Barley | 12.7 | none | 14.5 | 8.9 | 11.5 | 11.5 |
|  |  | 30 | 13.4 | 10.4 | 11.1 | 11.8 |
|  |  | 100 | 11.2 | 12.0 | 11.7 | 11.7 |
| Wheat | 16.8 | none | 21.7 | 18.1 | 17.6 | 16.4 |
|  |  | 30 | 20.8 | 18.2 | 17.3 | 23.3 |
|  |  | 100 | * |  |  |  |
| Rye | 12.0 | none | 15.7 | 8.1 | 9.3 | 12.7 |
|  |  | 30 | 10.0 | 10.7 | 11.2 | 13.6 |

TABLE III-continued

| Proteinaceous Material | | Amount of | Protein Content of Centrifuged Samples (%) | | | Protein Content |
|---|---|---|---|---|---|---|
| Type | Protein Content(%) | Water Added(5) | Top | Middle | Bottom | of Residue (%) |
| Buckwheat | 14.6 | 100 | * | | | |
| | | none | 33.3 | 28.7 | 18.1 | 6.6 |
| | | 30 | 33.8 | 28.6 | 17.8 | 7.6 |
| | | 100 | * | | | |

* no separation, sample was a "mush"

EXAMPLE IV

The procedure of Example I was repeated on navy beans except that methanol was used as solvent. The results were as follows:

| Proteinaceous Material | |
|---|---|
| Protein Content (%) | 24.8 |
| Crude Oil* Wt. (g) | 4.8 |
| Oversized Sample | |
| Wt. (g) | 102 |
| Protein Content (%) | 24.8 |
| Composite Sample | |
| Protein Content (%) | 21.6 |
| Cake Depth (mm) | 43 |
| Undersized Sample | |
| Protein Content (%) | |
| Top | 51.4 |
| Middle | 12.7 |
| Bottom | 18.9 |

*methanol-soluble fraction

EXAMPLE V

The procedure of Example I was repeated except that the 150 g of finely ground proteinaceous material were admixed in the form of a slurry with 300 g of hexane in a WARING* blender. The admixing in the WARING blender was carried out for 5 minutes and the slurry thus obtained was subsequently treated as in Example I.

Details of the proteinaceous materials used and the results obtained were as follows:

| | D | J | N |
|---|---|---|---|
| Proteinaceous Material | | | |
| Type** | | | |
| Protein Content (%) | 11.4 | 9.0 | 16.1 |
| Oil Wt. (g) | 3.7 | 1.9 | 2.1 |
| Oversized Sample | | | |
| Wt. (g) | 93 | 59 | 70 |
| Protein Content (%) | 10.6 | 12.4 | 16.5 |
| Composite Sample | | | |
| Protein Content (%) | 16.9 | 8.9 | 15.3 |
| Cake Depth (mm) | 46 | 60 | 55 |
| Undersized Sample | | | |
| Protein Content (%) | | | |
| Top | 39.2 | 37.9 | 47.4 |
| Middle | 16.4 | 6.5 | 10.5 |
| Bottom | 7.4 | 7.4 | 11.7 |

**See Example I

The analyses of the "top" samples of this Example and of Example I indicate the effect of the high speed agitation in the WARING blender on protein content of fractions.

EXAMPLE VI

A sample of proteinaceous material was admixed at ambient temperature with 400 ml of hexane in a vertical glass cylinder measuring 40 cm in height and 6 cm in diameter. The admixture was vigorously agitated for 30 minutes. The agitation was then decreased, thereby causing non-uniform distribution of the proteinaceous material in the hexane, and a major portion of the hexane solution was siphoned off and sieved with a 325 mesh TYLER screen. Any oversized material retained on the screen was returned to the cylinder.

The above procedure was repeated two times, 400 ml of hexane being added to the cylinder each time.

The oversized material remaining in the cylinder after completion of the above was dried and analysed for protein content. The solutions of undersized material i.e. that passing through the screen on each occasion, were combined and centrifuged. The hexane miscella was decanted off and the undersized material thus obtained was dried and analysed for protein content. The hexane was evaporated from the hexane miscella so as to obtain the oil.

All protein analyses were made using a macro-scale Kjeldahl method.

Details of the proteinaceous materials and the results obtained were as follows:

| Run | 1 | 2 | 3 | 4 | 5 |
|---|---|---|---|---|---|
| Proteinacous Material | | | | | |
| Type* | A | B | C | D | E |
| Weight (g) | 90.0 | 94.3 | 88.1 | 93.5 | 91.8 |
| Protein Content (%) | 16.4 | 11.1 | 11.3 | 12.6 | 12.9 |
| Oversized Material** | | | | | |
| Weight (g) | 71.6 | 52.2 | 55.8 | 64.0 | 73.3 |
| Protein Content (%) | 16.1 | 12.7 | 13.8 | 13.2 | 11.3 |
| Undersized Material | | | | | |
| Weight (g) | 6.2 | 28.1 | 27.1 | 20.1 | 12.2 |
| Protein Content (%) | 20.5 | 10.3 | 8.6 | 14.1 | 13.2 |
| Oil | | | | | |
| Weight (g) | 1.6 | 1.3 | 1.0 | 1.6 | 1.5 |

*A .....Selkirk hard red spring wheat
B ..... Frederick soft winter wheat
C ..... Tetra Petkus winter rye
D ..... Vanier barley
E ..... a hull-less barley
**in all runs the oversized material was buff in colour and the undersized material was white. The oversized material comprised bran and endosperm.

EXAMPLE VII

Approximately 3500 g of pinmilled Fredrick winter wheat were admixed, in the form of a slurry, with 15.9 liters of hexane for 10 minutes at ambient temperature. The resultant admixture was sieved using a SWECO* Vibro Energy Separator equipped with a 325 mesh TYLER screen. The oversized material (bran) i.e. that retained on the screen, was dried in a rotary vacuum drier and analyzed for protein content.

The undersized material (flour) i.e. that passing through the screen, was agitated so as to form a slurry and pumped through a 10 mm DORR-OLIVER DOXIE TYPE A* hydrocyclone at an inlet pressure of 2.8 kg/cm². The overflow fraction was centrifuged to separate the solid material from the hexane miscella and the solid material obtained is referred to below as "First Overflow Solids". The underflow fraction from the hydrocyclone was passed through the hydrocyclone again at an inlet pressure of 2.8 kg/cm². The overflow and underflow fractions thus obtained were separately centrifuged to separate the solid material from hexane miscella and the solid materials obtained are referred to below as "Second Overflow Solids" and "Underflow Solids" respectively. All the solids were dried in a rotary vacuum drier and analysed for protein content.

The oil was recovered from the combined hexane miscella.

All protein analyses were carried out on a Kjel-Foss Automatic 16210 protein analyzer.

The results obtained were as follows:

|  | Weight (g) | Protein Content (%) | Colour |
|---|---|---|---|
| Starting Material | 3500 | 9.5 | |
| First Overflow Solids | 13.2 | 43.2 | white |
| Second Overflow Solids** | 382.3 | 13.4 | white |
| Underflow Solids** | 955.5 | 5.1 | white |
| Oversized Material | 1840 | 12.1 | buff |
| Oil | 40.7 | | yellow-green |

*denotes trade mark
**The residual oil in the products, as determined by a hot Soxhlet extraction using hexane as solvent, was 0.1% for the Second Overflow Solids and 0.05% in the Underflow Solids.

The embodiments of the invention in which an exclusive property or privilege is claimed are defined as follows:

1. A process for the separation of proteinaceous material into at least two fractions, the proteinaceous material being selected from the group consisting of wheat, rye, barley, triticale, peas, beans and buckwheat, said process comprising:
   (a) admixing comminuted proteinaceous material with an organic solvent, said solvent being selected from the group consisting of pentane, hexane, heptane, cyclohexane and alcohols of 1-4 carbon atoms, and mixtures thereof, said proteinaceous material being essentially free of any hulls thereof; and
   (b) separating the admixture of comminuted proteinaceous material and solvent into at least two fractions, one fraction having outer coat of the proteinaceous material as a substantial part of the solid component and a second fraction having endosperm as the major solid component, the amount of endosperm separated being at least 5% of the comminuted proteinaceous material, said admixture being separated by a method selected from the group consisting of (a) sieving the admixture through a sieve capable of retaining substantially all of the outer coat on the mesh of the sieve and capable of passing solvent containing endosperm and (b) admixing the mixture under controlled conditions, said controlled conditions being adapted to cause non-uniform distribution of the comminuted proteinaceous material in the solvent, whereby separation of the admixture into fractions may be effected.

2. The process of claim 1 in which the second fraction is essentially free of outer coat of the proteinaceous material.

3. The process of claim 2 in which the solvent is selected from the group consisting of pentane, hexane, heptane and cyclohexane, and mixtures thereof.

4. The process of claim 2 in which one or more of outer coat, endosperm and oil are subsequently recovered in an essentially solvent-free form.

5. The process of claim 2 in which the admixture is separated by sieving and at least 20% of the endosperm passes through the sieve.

6. The process of claim 2 in which the proteinaceous material is wheat.

7. The process of claim 2 in which the proteinaceous material is rye.

8. The process of claim 2 in which the proteinaceous material is barley.

9. The process of claim 2 in which the proteinaceous material is triticale.

10. The process of claim 2 in which the proteinaceous material is peas.

11. The process of claim 2 in which the proteinaceous material is beans.

12. The process of claim 2 in which the proteinaceous material is buckwheat.

13. The process of claim 2 in which the proteinaceous material is selected from the group consisting of wheat, rye and triticale, and said proteinaceous material has a hardness of less than 50.

14. The process of claim 2 in which the proteinaceous material is wheat of a hardness of less than 50.

15. A process for the separation of comminuted proteinaceous material into fractions differing in composition, the proteinaceous material being selected from the group consisting of wheat, rye, barley, triticale, peas, beans and buckwheat, said process comprising:
   (a) admixing comminuted proteinaceous material or matter derived from said proteinaceous material with an organic solvent in the form of a slurry, said solvent being selected from the group consisting of pentane, hexane, heptane, cyclohexane and alcohols of 1-4 carbon atoms and mixtures thereof; said proteinaceous material being essentially free of any hulls thereof; and
   (b) and controlling the centrifugal force whereby the comminuted proteinaceous material in said slurry is separated into at least two fractions, said fractions differing in composition.

16. The process of claim 15 in which each of said fractions contains at least 5% of the comminuted proteinaceous material and in which one fraction is endosperm, said endosperm being essentially free of the outer coat of the proteinaceous material.

17. The process of claim 16 in which the slurry is subjected to the influence of centrifugal force in a hydrocyclone.

18. The process of claim 16 in which the slurry is subjected to the influence of centrifugal force in a continuous centrifuge.

19. The process of claim 15 in which each of said fractions contains at least 20% of the comminuted proteinaceous material.

20. The process of claim 16 in which the solvent is selected from the group consisting of pentane, hexane, heptane and cyclohexane, and mixtures thereof.

21. The process of claim 20 in which a slurry of one of said fractions is subsequently subjected to the influence of centrifugal force to separate said one fraction into at least two additional fractions, said additional fractions differing in protein content.

22. The process of claim 20 in which the proteinaceous material is wheat.

23. The process of claim 20 in which the proteinaceous material is rye.

24. The process of claim 20 in which the proteinaceous material is barley.

25. The process of claim 20 in which the proteinaceous material is triticale.

26. The process of claim 20 in which the proteinaceous material is peas.

27. The process of claim 20 in which the proteinaceous material is beans.

28. The process of claim 20 in which the proteinaceous material is buckwheat.

29. The process of claim 20 in which the proteinaceous material is selected from the group consisting of wheat, rye and triticale, and said proteinaceous material has a hardness of less than 50.

30. The process of claim 20 in which the proteinaceous material is wheat of a hardness of less than 50.

31. A process for the separation of comminuted proteinaceous material into fractions differing in composition, the proteinaceous material being selected from the group consisting of wheat, rye, barley, triticale, peas, beans and buckwheat, said process comprising:
  (a) admixing a proteinaceous fraction, derived from said comminuted proteinaceous material and essentially free of outer coat, with an organic solvent, said organic solvent being selected from the group consisting of pentane, hexane, heptane, cyclohexane and alcohols of 1–4 carbon atoms, and mixtures thereof;
  (b) subjecting said admixture to the influence of centrifugal force in a centrifuge and thereby forming a centrifuge cake of said proteinaceous fraction; and
  (c) separating said cake in the substantial absence of said solvent into at least two layers, the protein content of at least one of said layers being different from the protein content of at least one of said other layers.

32. The process of claim 21 in which the proteinaceous fraction is comprised of endosperm.

33. The process of claim 32 in which each fraction contains at least 5% of the proteinaceous fraction.

34. The process of claim 32 in which each fraction contains at least 20% of the proteinaceous fraction.

35. The process of claim 34 in which the solvent is selected from the group consisting of pentane, hexane, heptane and cyclohexane, and mixtures thereof.

36. The process of claim 35 in which the proteinaceous material is wheat.

37. The process of claim 35 in which the proteinaceous material is rye.

38. The process of claim 35 in which the proteinaceous material is barley.

39. The process of claim 35 in which the proteinaceous material is triticale.

40. The process of claim 35 in which the proteinaceous material is peas.

41. The process of claim 35 in which the proteinaceous material is beans.

42. The process of claim 35 in which the proteinaceous material is buckwheat.

43. The process of claim 35 in which the proteinaceous material is selected from the group consisting of wheat, rye and triticale, and said proteinaceous material has a hardness of less than 50.

44. The process of claim 35 in which the proteinaceous material is wheat of a hardness of less than 50.

* * * * *

UNITED STATES PATENT OFFICE
CERTIFICATE OF CORRECTION

PATENT NO. : 4,154,728
DATED : May 15, 1979
INVENTOR(S) : Richard Walton Oughton It is certified that error appears in the above-identified patent and that said Letters Patent are hereby corrected as shown below:

Col. 2, line 14, "an" should be deleted after "having".

Col. 8, Table III, third column, in the heading, "Water Added(5)" should read --Water Added(%)--.

Col. 9, Table III-continued, third column, "Water Added(5)" should read --Water Added(%)--.

Claim 15, line 37, after "(b)" the following should be inserted --subjecting the slurry to the influence of centrifugal force and--.

Signed and Sealed this

Second Day of October 1979

[SEAL]

Attest:

RUTH C. MASON
Attesting Officer

LUTRELLE F. PARKER
Acting Commissioner of Patents and Trademarks